United States Patent [19]

Janson

[11] 4,239,092
[45] Dec. 16, 1980

[54] ADJUSTABLE TENSIONER

[75] Inventor: Gunnar H. Janson, Dudley, Mass.

[73] Assignee: Dana Corporation, Toledo, Ohio

[21] Appl. No.: 937,069

[22] Filed: Aug. 28, 1978

[51] Int. Cl.³ .......................................... F16F 15/03
[52] U.S. Cl. ................................ 188/267; 192/21.5;
192/53 D; 192/84 PM
[58] Field of Search ............. 192/21.5, 84 PM, 53 D,
192/84 E, 94; 310/92, 93; 285/9 M; 188/267,
268, 164

[56] References Cited

U.S. PATENT DOCUMENTS

| 1,535,238 | 4/1925 | Miller | 192/94 |
|---|---|---|---|
| 2,226,227 | 12/1940 | Hodges | 192/94 X |
| 2,778,466 | 1/1957 | Perry, Jr. | 310/92 X |
| 2,897,934 | 8/1959 | Fitch | 192/84 E |
| 3,216,542 | 11/1965 | Comstock | 192/21.5 |
| 3,366,903 | 1/1968 | Searle et al. | 188/267 X |
| 3,419,118 | 12/1968 | Allaben, Jr. | 192/94 X |
| 3,749,955 | 7/1973 | Fetzer | 310/93 |
| 4,122,922 | 10/1978 | Baermann | 188/267 |

FOREIGN PATENT DOCUMENTS

| 563552 | 9/1958 | Canada | 192/21.5 |
|---|---|---|---|
| 1056885 | 5/1959 | Fed. Rep. of Germany | 192/53 D |
| 1061578 | 7/1959 | Fed. Rep. of Germany | 192/21.5 |
| 693955 | 7/1953 | United Kingdom . | |
| 776714 | 6/1957 | United Kingdom . | |
| 890357 | 2/1962 | United Kingdom . | |
| 349825 | 9/1972 | U.S.S.R. | 192/21.5 |

Primary Examiner—C. J. Husar
Assistant Examiner—Moshe I. Cohen
Attorney, Agent, or Firm—Oliver E. Todd, Jr.

[57] ABSTRACT

This invention relates to a magnetic tensioning device comprising a rotatable outer housing and a magnetic assembly positioned in the interior of the outer housing. A space is provided between the outer housing and the magnetic assembly. A plurality of magnetic particles are positioned in the space between the magnetic assembly and the outer housing. The magnetic particles are held in place by the magnetic flux from the magnetic assembly and the magnetic particles magnetically couple the magnetic assembly and the outer housing. Means for varying the size of the space between the magnetic assembly and the outer housing is provided. The varying of the size of the space varies the magnetic flux from the magnetic assembly and changes the magnetic coupling between the magnetic assembly and the outer housing.

8 Claims, 6 Drawing Figures

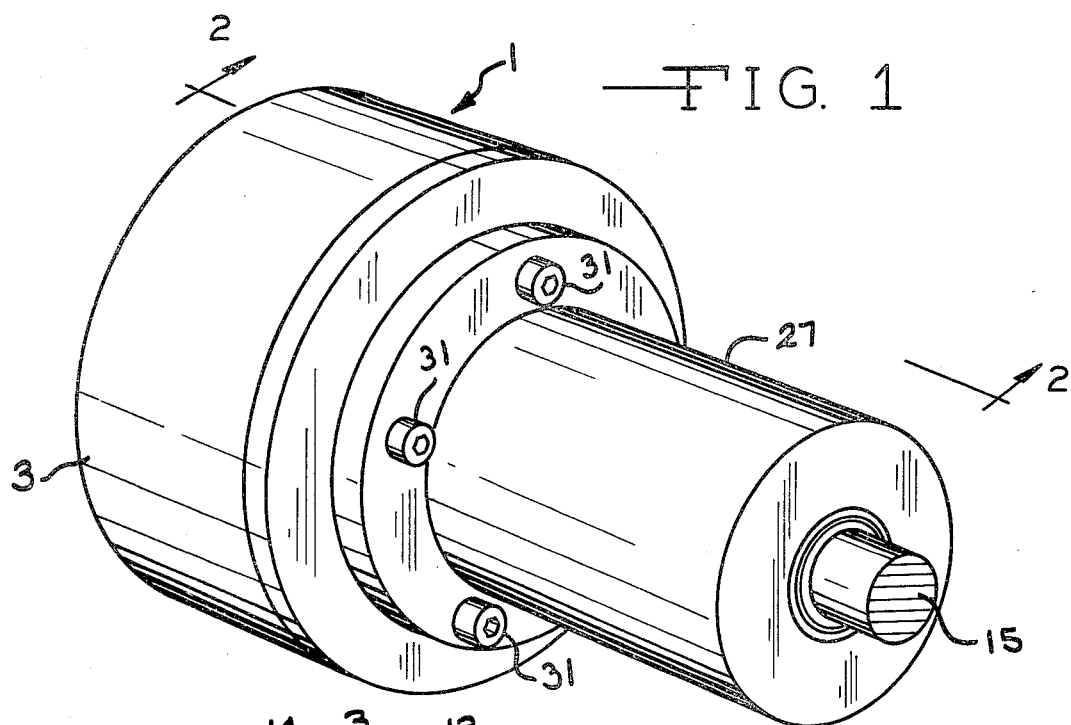
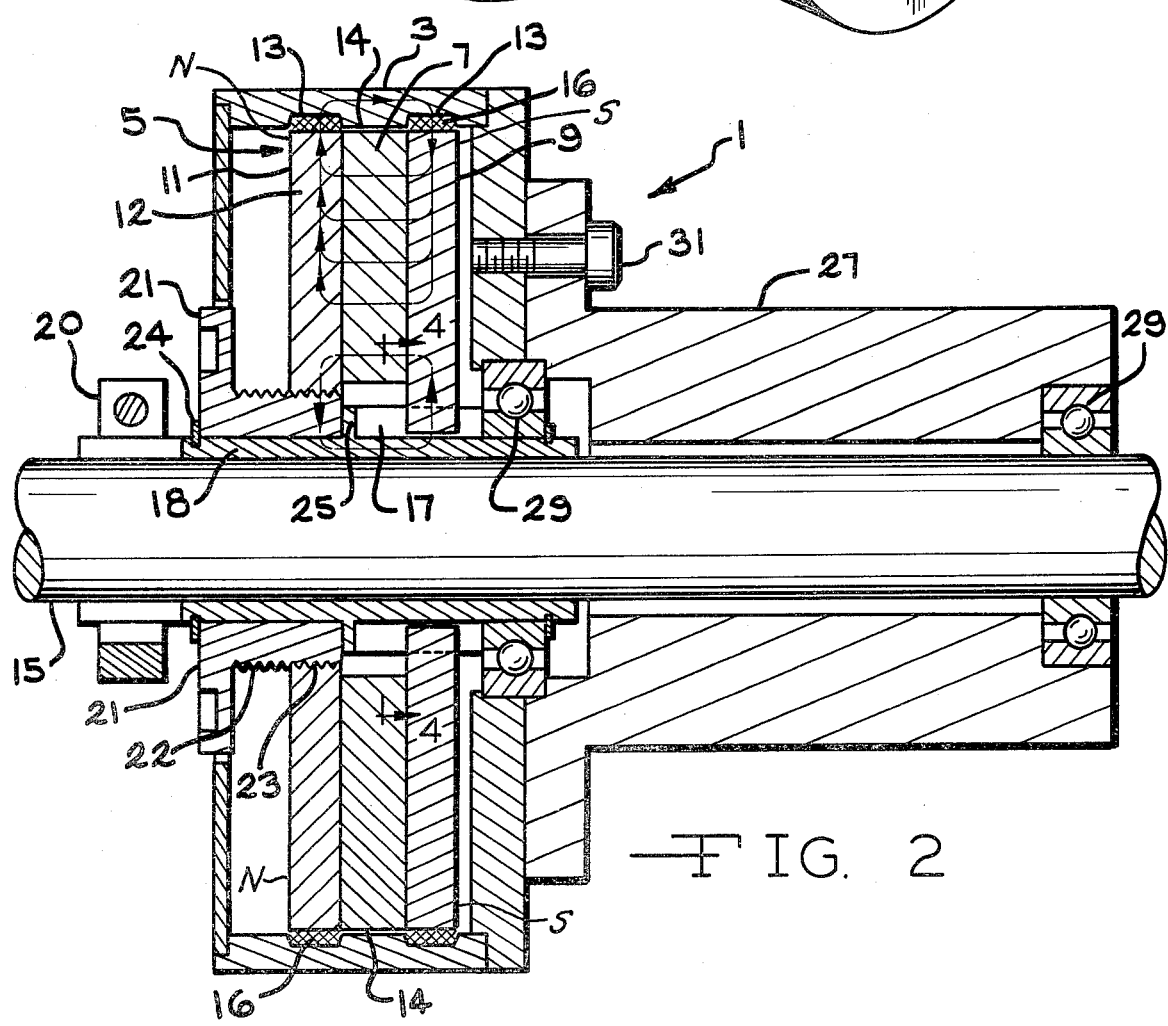

ADJUSTABLE TENSIONER

BACKGROUND OF THE INVENTION

This invention pertains to a tensioning device or slip clutch. In one of its more specific aspects, the invention relates to a tensioning device utilizing a permanent magnet and a magnetic coupling provided by magnetic particles to obtain an adjustable torque slip clutch.

Tensioners or slip clutches have been used for a number of years in industrial uses. One function of these tensioners or clutches is to provide a certain level of torque or resistance to turning in machinery where material is being wound or unwound on a mandril. In the past, friction clutches have been frequently used to provide the desired resistance to turning. However, friction clutches have a disadvantage because the friction material slips or abrades and gradually wears out. Thus, the life of the friction clutch can be fairly short and is dependent upon the level of abrasion produced as the friction surfaces slip over one another. Another factor that limits the usefulness of this type of clutch arrangement is that as the friction surfaces wear the surfaces often do not provide the same amount of torque or resistance to turning. Therefore, the torque or resistance to turning can vary in the friction clutch due to the amount of wear received by the friction surfaces of the clutch. Another difficulty is that a powdery material can be produced as the friction surfaces wear. The powder is usually contained within the friction clutch mechanism and frequently causes difficulty with the operation of the friction clutch.

An electrically magnetized coil can be used to provide the desired resistance to turning. However, it is frequently difficult to provide the electrically wiring and power required to energize the magnetizable coil. The difficulties associated with an electrially magnetized coil are further compounded in areas where electrical power is not readily available or where power outages occur during the operation of the coil. Clearly such difficulties render the electrically magnetized coil virtually useless as a tensioning device or slip clutch.

A permanent magnet and the magnetic flux from the magnet can be used to link two coupling elements to provide the desired resistance to turning. The difficulty with using a permanent magnet is that it is very difficult to adjust the magnetic flux of the magnet to vary the torque or resistance to turning produced by the magnet. In the past, flux gates, as shown in U.S. Pat. No. 3,822,290, have been used to vary the magnetic flux produced by the permanent magnet. However, flux gates have the disadvantage in that they reduce the maximum torque capability for a given size magnet. Thus, to produce a tensioning device having the desired torque range it would be necessary to use a much larger permanent magnet if a flux gate is used as the means for varying the output torque of the magnet.

An adjustable magnetic shunt can also be positioned at the center of the magnet as a means for adjusting the flux of the magnet. However, to affect a large change in the working flux of the magnet, it is necessary to make the area of the shunt a large fraction of the area of the magnet. The large size of the magnetic shunt adversely effects the relationship between the torque output and the size of the tensioning device. In other words the use of a magnetic shunt has the disadvantage of inherently increasing the size of the tensioner to provide the desired range of torque or resistance to turning.

SUMMARY OF THE INVENTION

According to the invention there is provided a magnetic tensioning device comprising a rotatable outer housing and a magnetic assembly positioned in the interior of the outer housing. A space is provided between the outer housing and the magnetic assembly. A plurality of magnetic particles is positioned in the space between the magnetic assembly and the outer housing. The magnetic particles are held in place by the magnetic flux from the magnetic assembly and the magnetic particles magnetically couple the magnetic assembly and the outer housing. Means for varying the size of the space between the magnetic assembly and the outer housing is provided. The varying of the size of the space varies the magnetic flux from the magnetic assembly and changes the magnetic coupling between the magnetic assembly and the outer housing.

DESCRIPTION OF THE DRAWINGS

FIG. 1 is a perspective view of the tensioning device.

FIG. 2 is a cross sectional view of the tensioning device taken along line 2—2 and shown adjusted for a minimum torque transfer.

DESCRIPTION OF PREFERRED EMBODIMENTS

Figure 5:
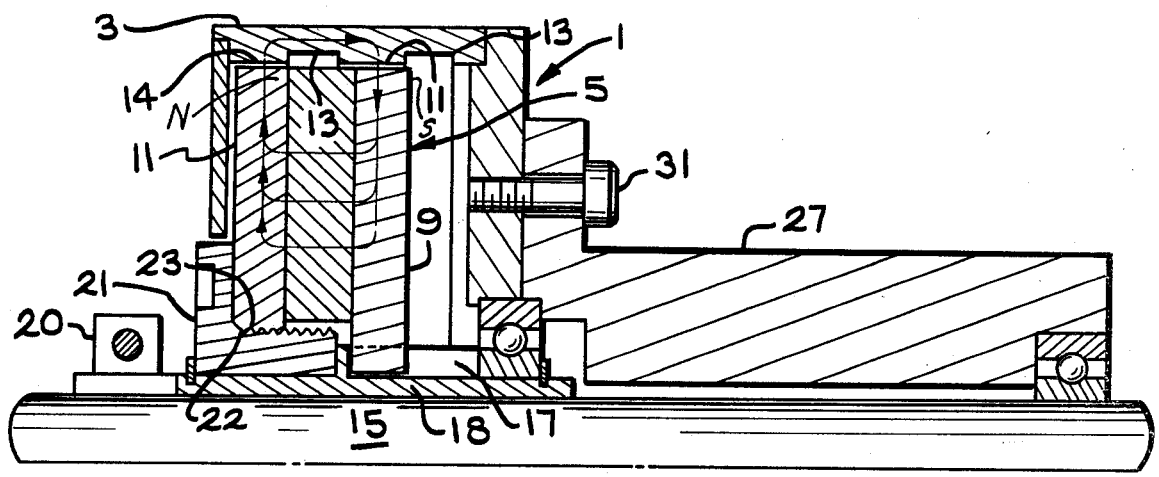
FIG. 5 is a partial cross sectional view of the tensioning device and shown adjusted for a maximum torque transfer.
Figure 3:
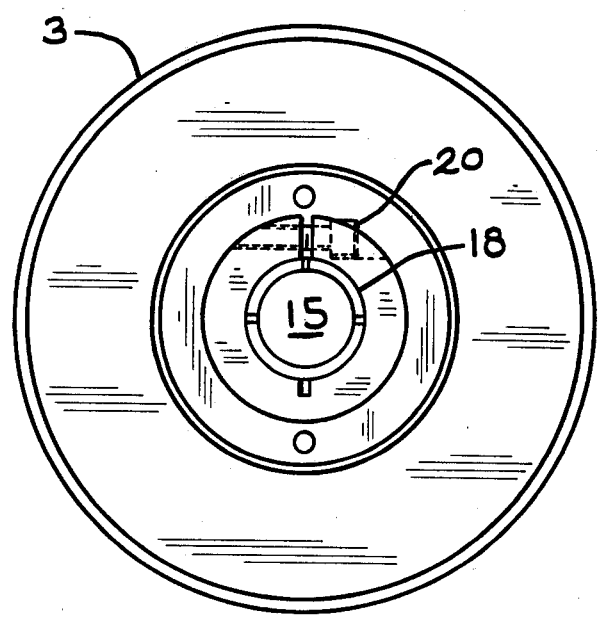
FIG. 3 is an end elevation view of the tensioning device.

The tensioning device of this invention will be more fully understood by referring to the attached drawings in relation to the following description.

FIGS. 1, 2, 3 and 4 shows a tensioning device 1 that is comprised of an outer housing 3 that is generally cylindrical in shape. The outer housing is usually constructed from magnetizable metal such as cold rolled steel tubing. A substantially cylindrical magnetic assembly 5 is positioned in the interior of the outer housing. The magnetic assembly contains a permanent magnet 7, such as a ceramic magnet. Structurally bonded to the magnet is a first magnetically soft plate 9 and a second magnetically soft plate 11. The permanent magnet and the plates are magnetized as an assembly so that one face of the magnet (labeled N) is a north pole and the other face (labeled S) a south pole. The two magnetically soft plates act as flux collectors and concentrate the magnetic flux that is produced by the permanent magnet. The lines of magnetic flux, produced by the permanent magnet, are shown as lines 12. The two magnetically soft plates are usually constructed of a material such as steel and, accordingly, the plates are magnetically soft but not necessarily mechanically soft.

On the inner peripheral surface of the outer housing 3 there are positioned two radial grooves 13. The radial grooves 13 are spaced substantially the same distance apart as the two magnetically soft plates 9 and 11 on the magnetic assembly. The widths of the two radial grooves are substantially the same as the widths of the magnetically soft plates. As shown in FIG. 2 the position of the two magnetically soft plates corresponds generally with the position of the two radial grooves 13 in the outer housing.

An annular space 14 is located between the outer peripheral surface of the magnetic assembly 5 and the inner peripheral surface of the outer housing 3. The space 14 is usually between from about 0.020" to about 0.050" in size although the space can be almost any size to accomodate different torque requirements for the tensioning device. It should also be noted that the space between the magnetic assembly and the outer housing will increase in the area of the two radial grooves 13.

Positioned in the space between the magnetic assembly and the outer housing are a plurality of magnetic particles 16. The magnetic particles are attracted by the magnetic flux from the permanent magnet 7. The two magnetically soft plates 9 and 11 concentrate the magnetic flux and pass the flux through the outer periphery of the soft plates. Accordingly, the magnetic particles are concentrated in the annular space 14 near the outer peripheral edge of the plates.

A stationary, shaft 15 passes through the center of the adjustable tensioner. A spindle shaft 18, having an axial keyway 17 is positioned on a portion of the shaft 15. Spindle shaft 18 is preferably a non-magnetic material, such as 300 series stainless steel, to provide a high reluctance path that minimizes magnetic flux leakage through the inside diameter of the permanent magnet 7. Shaft 15 can be a magnetizable metal since spindle shaft 18 minimizes flux leakage from the permanent magnet. The spindle shaft is positioned in non-rotatable relationship on the shaft 15 by securement means 20. The first soft plate 9 extends into the axial keyway 17 and the position of the first soft plate in the keyway prevents the magnetic assembly from rotating relative to the shaft 15. However, the first soft plate 9 is free to move in an axial direction along the keyway 17. Accordingly, the magnetic assembly is also free to move in an axial direction relative to the shaft 15.

An adjustment mechanism 21 is rotatably positioned on the spindle shaft 18. A snap ring 24 is positioned in a groove on the spindle shaft 18 in contact with one end of the adjustment mechanism. The other end of the adjustment mechanism is in contact with a shoulder 25 that is located on the spindle shaft 18 where the axial keyway 17 terminates. The snap ring 24 and shoulder 25 act to restrain the adjustment mechanism 21 from axial movement along the shaft 15 while allowing the adjustment mechanism to rotate freely around the shaft 15. The adjustment mechanism has a plurality of threads 22 positioned on one surface. Threads 23, that are mateable with threads 22 on the adjustment mechanism, are positioned on the inner peripheral edge of the second magnetically soft plate 11. The second magnetically soft plate 11 and the adjustment mechanism 21 are positioned with respect to one another so that the threads 22 and 23 are in engaging relationship.

A rotatable chuck 27 is mounted on the shaft 15. Suitable bearings 29 are positioned on the stationary shaft 15 so that the chuck 27 is free to rotate relative to the shaft. Bolts 31 or other suitable fastening means are used to secure one end of the rotatable chuck to the outer housing 3. The outer housing 3 is also positioned on bearings 29 and is free to rotate relative to the shaft 15. The rotatable chuck is attached to the outer housing in such a manner that the housing rotates when the chuck is caused to rotate.

FIG. 5 shows the magnetic assembly 5 in another position with respect to the outer housing 3. The magnetic assembly has moved axially along the shaft 15 and plate 9 has moved axially along keyway 17. The threads 23 on the plate 11 have also moved axially along the threads 22 on the adjustment mechanism 21. In this position the two magnetically soft plates are no longer in alignment with the two radial grooves 13 in the outer housing 3. In this position, the space 14 between the two magnetically soft plates and the outer housing will be considerably less than the space when the two plates are in alignment with the radial grooves.

In operation the magnetic flux from the north pole of the magnet 7 passes into the second soft plate 11 where the flux is concentrated and directed so that the flux passes through the outer peripheral edge of the second plate. The magnetic flux then passes through the space 14 positioned between the magnetic assembly and the outer housing 3. The magnetic flux passes through the material of the outer housing, back across the space 14 and into the outer peripheral edge of the first soft plate 9. The second soft plate directs this flux to the south magnetic pole of the permanent magnet 7. As the magnetic flux passes through the outer peripheral ends of the soft plates, the magnetic particles 16 will be attracted by this magnetic flux. Accordingly, the magnetic particles are concentrated at the outer peripheral edges of the two soft plates. As the magnetic flux passes between the outer peripheral edges of the two plates and the outer housing of the adjustable tensioner there are lines of flux between the outer peripheral edges of the plates and the outer housing. Accordingly, the magnetic particles 16 are attracted to these lines of flux and form chains or columns of magnetic particles across the space between the outer peripheral edges of the two plates and the outer housing. These chains of magnetic particles form a magnetic coupling between the magnetic assembly and the outer housing of the tensioning device. Thus, the magnetic particles form a magnetic connection or bond between the magnetic assembly and the outer housing.

The strength of the chains or columns formed by the magnetic particles is dependent upon the strength of the magnetic flux passing across the space 14 between the magnetic assembly and the outer housing. The strength of the lines of flux will be dependent upon the strength of the permanent magnet, the degree of collection and concentration of the flux by the two magnetically soft plates, the size of the space 14 between the magnetic assembly and the outer housing, and the material of which the outer housing is formed. It should be noted that the larger the space 14 between the magnetic assembly and the outer housing, the weaker the lines of flux bridging this space will be.

This is a result of the fact that the magnetic flux does not travel across an air space nearly as well as it travels through a magnetic material.

In the tensioning device 1 shown in FIG. 2 the two soft magnetic plates are positioned so that they are in substantial alignment with the two radial grooves 13 in the outer housing 3. In this position the lines of magnetic flux, bridging across the space 14 between the outer peripheral edges of the plates and the outer housing, will have to pass through the additional air space created by the two radial grooves. This reduces the strength of the magnetic flux bridging across this space and, accordingly, reduces the strength of the chains or columns of magnetic particles formed along the lines of magnetic flux. In this position the connection or torque transfer between the magnetic assembly 5 and the outer housing 3 would be at its lowest point.

To increase the connection or coupling between the magnetic assembly and the outer housing 3 the magnetic assembly must be moved or shifted axially so that the two magnetically soft plates are no longer in complete alignment with the two radial grooves 13. The moving of the magnetic assembly can be accomplished by causing the adjustment mechanism 21 to rotate. The rotation of the adjustment mechanism 21 causes the threads 23 on the inner peripheral edge of the second plate 11 to advance along the threads 22 located on the adjustment mechanism 21. Thus, the rotation of the adjustment mechanism 21 causes the second plate 11 to move axially along the threads 22 away from the chuck 27. It should be noted, that as the second plate 11 moves, the entire magnetic assembly 5 will also move with the second plate. Since the first plate 9 is positioned in axial keyway 17 located on spindle shaft 18 the magnetic assembly 5 will be free to move in an axial direction along the shaft 15. However, the positioning of the first plate 9 in the axial keyway 17 will prevent the magnetic assembly 5 from moving in a radial direction with respect to shaft 15 or the outer housing 3. The movement of the magnetic assembly 5 causes the two plates to move out of alignment with the two radial grooves 13. As the two plates move out of alignment with the radial grooves 13 the air gap between the outer peripheral edge of the two plates and the outer housing 3 will be reduced and the strength of the lines of magnetic flux bridging the space 14 will be increased. Reducing the size of the space will result in stronger chains or columns of magnetic particles being formed in the space 14 between the outer peripheral edge of the plates and the outer housing 3. Thus, as the magnetic assembly is moved out of alignment with the two radial grooves the strength of the coupling or connection between the magnetic assembly and the outer housing 3 will increase until the two plates are completely out of alignment with the radial grooves 13. When the two plates are completely out of alignment with the radial grooves, as shown in FIG. 5, the coupling between the magnetic assembly 5 and the outer housng 3 will be at the maximum level.

In operation, material that is to be wound or unwound will be placed on the chuck 27. The chuck 27 is supported on bearing 29 and is free to rotate about shaft 15. However, the chuck 27 is securely attached to the outer housing 3 of the adjustable tensioner. Thus, as the chuck is rotated to either collect or dispense the material positioned thereon, the outer housing 3 will also rotate. However, the chains or columns of magnetic particles 16, formed between the magnetic assembly 5 and the outer housing 3, will resist this movement. Therefore, for the outer housing 3 to rotate the chains or columns of magnetic particles must be broken and the force or torque required to break the chains of magnetic particles will be proportional to the strength of the lines of flux passing between the magnetic assembly and the outer housing. Thus, as the outer housing 3 rotates, the chains of magnetic particles will continuously be broken and reformed. The breaking of the chains of magnetic particles will supply a constant force or torque that resists the turning of the outer housing and the chuck.

If it is desired to change the tension on the chuck the adjustment mechanism 21 can be rotated to reposition the magnetic assembly 5 with respect to the radial grooves 13 until the desired amount of tension is supplied to resist the rotation of the chuck 27.

Figure 6:
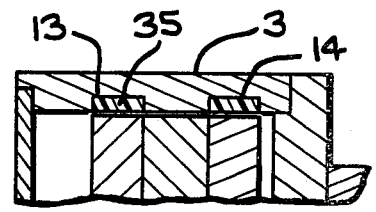
FIG. 6 is a partial cross sectional view of another embodiment of the tensioning device.
Figure 4:
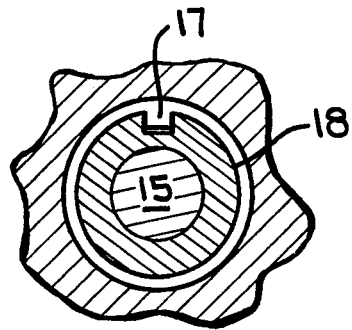
FIG. 4 is a partial cross sectional view of the tensioning device taken along line 4—4 of FIG. 2.

FIG. 6 shows another embodiment that can be used in the tensioning device. In this embodiment the outer housing 3 is adapted with radial grooves 13 and a non-magnetic insert 35 has been positioned in the radial grooves. When the two magnetically soft plates are positioned so that their outer peripheral edges are in alignmnent with the radial grooves 13, the magnetic flux flowing from the outer peripheral edge of the plates will pass through the non-magnetic inserts 35 located in the two radial grooves 13. The non-magnetic material in the inserts will act as a poor conductor of the magnetic flux and will result in a reduction in the force of the magnetic flux passing from the outer peripheral edge of the plates into the outer housing. It should be noted that the non-magnetic material of the inserts will result in a decrease in the strength of the magnetic flux that is greater than the decrease that is present when the magnetic flux passes through an air gap. As the strength of the magnetic flux is decreased the magnetic particles 16 located in the space 14 between the outer peripheral edge of the magnetic assembly 5 and the outer housing 3 will be subjected to a lower magnetic flux. Accordingly, the magnetic particles 16 will form chains or columns across the space 14 that are not as strong as the columns that are formed when the non-magnetic inserts 35 are not present in the radial grooves 13. Thus, when the non-magnetic inserts 35 are positioned in the radial grooves the magnetic coupling between the magnetic assembly 5 and the outer housing 3, created by the magnetic particles 16, will be decreased. Accordingly, the resistance to turning of the outer housing 3 and the chuck 27, that is connected to the outer housing, will be reduced. It should be noted that the non-magnetic inserts 35 will act to reduce the magnetic coupling between the outer housing 3 and magnetic assembly 5 until the two plates are moved to a position where they are completely out of alignment with the non-magnetic inserts 35 located in the outer housing.

From the above it can be seen that the non-magnetic inserts 35 will act to lower the magnetic coupling between the magnetic assembly 5 and the outer housing 3 when the magnetic assembly is in the position where there is the least amount of magnetic coupling. Thus, the non-magnetic inserts reduce the resistance to rotation of the tensioning device at the lower end of the tension range when the two magnetically soft plates are at least partially in alignment with the non-magnetic inserts 35.

Having described the invention in detail and with reference to the drawings, it will be understood that such specifications are given for the sake of explanation. Various modifications and substitutes, other than those cited, can be made without departing from the scope of the invention as defined by the following claims.

What I claim is:

1. A magnetic tensioning device comprising a rotatable outer housing having an outer surface and an inner surface defining at least two radial grooves, a magnetic assembly positioned in the interior of said outer housing, said magnetic assembly including a permanent magnet and two magnetically soft plates positioned on each side of said permanent magnet, said plates having predetermined thicknesses and a predetermined spacing, said plates acting as flux collectors to concentrate magnetic flux from said permanent magnet, said magnetic assembly and said inner peripheral surface of said outer housing defining an annular space, a plurality of magnetic particles positioned in said space and held in place by such magnetic flux from said magnetic assembly, said magnetic particles magnetically coupling said magnetic assembly to said outer housing, and means including said grooves for varying the size of the space between said magnetic assembly and said outer housing to change the magnetic coupling between said magnetic assembly and said outer housing.

2. The tensioning device of claim 1, and further including a shaft passing through said outer housing, and means rotatably mounting said outer housing on said shaft.

3. The tensioning device of claim 2, wherein said radial grooves are substantially the same width as said predetermined thicknesses of said two magnetically soft plates, and wherein said radial grooves are spaced apart by substantially said predetermined spacing of said two magnetically soft plates.

4. The tensioning device of claim 3, and further including a chuck rotatably mounted on said shaft, and means attaching said chuck to said outer housing.

5. The tensioning device of claim 3, and further including non-magnetic inserts filling said grooves.

6. The tensioning device of claim 3, wherein said means for varying the size of the space includes means for moving said magnetic assembly axially along said shaft with respect to said two radial grooves to vary the size of said space between said magnetic assembly and said outer housing.

7. The tensioning device of claim 6, wherein said magnetic particles form chains in said space along the line of magnetic flux between said magnetic assembly and said outer housing, such chains of magnetic particles magnetically coupling said magnetic assembly and said outer housing.

8. A magnetic tensioning device comprising a rotatable outer housing, said housing having an interior surface defining at least two radial grooves, a non-rotating shaft positioned in said housing, a magnetic assembly positioned in and spaced from said outer housing, said magnetic assembly comprising a permanent magnet, a first magnetically soft plate and a second magnetically soft plate, means securing said magnetically soft plates to opposite sides of said permanent magnet, means mounting said first plate for axial movement on said shaft, said mounting means preventing rotational movement between said first plate and said shaft, said first and second magnetically soft plates collecting and directing magnetic flux from said permanent magnet, a plurality of magnetic particles positioned between said magnetic assembly and said outer housing, said magnetic particles forming chains in the space between said magnetic assembly and said outer housing along lines of magnetic flux between said magnetic assembly and said outer housing, such chains of magnetic particles magnetically coupling said magnetic assembly and said outer housing, output means rotatably positioned on said shaft, means attaching said output means to said outer housing, and means for moving said magnetic assembly axially along said shaft to change the position of said magnetic assembly with respect to said radial grooves in said housing to vary the magnetic flux between said magnetic assembly and outer housing to in turn vary the magnetic coupling between said magnetic assembly and said outer housing whereby the resistance to turning of said outer housing and said output means is varied.

* * * * *